US00RE50623E

(19) United States
(12) Reissued Patent
Zhang et al.

(10) Patent Number: US RE50,623 E
(45) Date of Reissued Patent: Oct. 7, 2025

(54) METHOD FOR IDENTIFYING DEVICE, AND DEVICE

(71) Applicant: Huawei Device Co., Ltd., Dongguan (CN)

(72) Inventors: Yajun Zhang, Shenzhen (CN); Yu Zhu, Shenzhen (CN)

(73) Assignee: HUAWEI DEVICE CO., LTD., Dongguan (CN)

(21) Appl. No.: 18/511,687

(22) Filed: Nov. 16, 2023

Related U.S. Patent Documents

Reissue of:
(64) Patent No.: 9,519,558
Issued: Dec. 13, 2016
Appl. No.: 14/847,413
Filed: Sep. 8, 2015

U.S. Applications:
(63) Continuation of application No. 16/218,410, filed on Dec. 12, 2018, now Pat. No. Re. 49,837, which is an
(Continued)

(30) Foreign Application Priority Data

Jun. 28, 2013 (CN) ..... 201310269569.3

(51) Int. Cl.
*G06F 3/00* (2006.01)
*G06F 11/30* (2006.01)
(Continued)

(52) U.S. Cl.
CPC ..... *G06F 11/3051* (2013.01); *G06F 11/3041* (2013.01); *G06F 13/102* (2013.01);
(Continued)

(58) Field of Classification Search
CPC ..... G06F 13/102; G06F 11/3041; G06F 11/3051; H04N 7/0255; H04L 67/16; G09G 5/006; G09G 2370/04
See application file for complete search history.

(56) References Cited

U.S. PATENT DOCUMENTS 7,103,834 B1 * 9/2006 Humpleman ..... H04L 12/2803 348/E5.006
7,653,212 B2 * 1/2010 Haughawout ..... G08C 19/28 348/734
(Continued)

FOREIGN PATENT DOCUMENTS

CN 1968150 A 5/2007
CN 102204271 A 9/2011
(Continued)

OTHER PUBLICATIONS

DLNA Networked, vol. 1: Architectures and Protocols, An Industry Guide for Building Interoperable Platforms, Devices, and Applications, Aug. 2009, 770 pages.
(Continued)

*Primary Examiner* — Ovidio Escalante
(74) *Attorney, Agent, or Firm* — Conley Rose, P.C.

(57) ABSTRACT

A method for identifying a device comprising generating, by a control device, an identification identifier of a multimedia device according to device description information of the multimedia device, sending the identification identifier to the multimedia device, so that the multimedia device displays the identification identifier, acquiring, by the control device, the identification identifier displayed by the multimedia device and an appearance image of the multimedia device, and acquiring the device description information according to the identification identifier displayed by the multimedia device, and associating, by the control device, the device description information with the appearance image of the multimedia device, so that a user equipment identifies the multimedia device according to the appearance image.

20 Claims, 5 Drawing Sheets

Related U.S. Application Data application for the reissue of Pat. No. 9,519,558, which is a continuation of application No. PCT/CN2014/080599, filed on Jun. 24, 2014.

(51) Int. Cl.

| | |
|---|---|
| ***G06F 13/10*** | (2006.01) |
| ***G09G 5/00*** | (2006.01) |
| ***H04L 29/08*** | (2006.01) |
| ***H04L 67/51*** | (2022.01) |
| ***H04N 7/025*** | (2006.01) |

(52) U.S. Cl.

CPC ..... *G09G 5/006* (2013.01); *H04L 67/51* (2022.05); *H04N 7/0255* (2013.01); *G09G 2370/04* (2013.01)

(56) References Cited

U.S. PATENT DOCUMENTS

| | | | | |
|---|---|---|---|---|
| 8,896,426 | B1 * | 11/2014 | Mui | G08C 19/00 340/10.51 |
| 2003/0007505 | A1 | 1/2003 | Noda et al. | |
| 2003/0126239 | A1 | 7/2003 | Hwang | |
| 2004/0103184 | A1 * | 5/2004 | Humpleman | H04L 12/2803 709/223 |
| 2005/0011957 | A1 | 1/2005 | Attia et al. | |
| 2005/0251549 | A1 * | 11/2005 | Hlasny | H04L 12/2803 709/203 |
| 2007/0104193 | A1 | 5/2007 | Choi | |
| 2007/0214241 | A1 * | 9/2007 | Song | H04L 67/025 709/219 |
| 2010/0231729 | A1 | 9/2010 | Lee | |
| 2012/0001724 | A1 * | 1/2012 | Belimpasakis | G16Y 40/10 340/5.1 |
| 2012/0054385 | A1 * | 3/2012 | Lim | H04L 12/2809 710/63 |
| 2012/0190346 | A1 | 7/2012 | Kim | |
| 2013/0103847 | A1 * | 4/2013 | Brown | H04W 4/21 709/229 |
| 2013/0108113 | A1 * | 5/2013 | Zhao | H04L 67/303 382/103 |
| 2013/0136363 | A1 | 5/2013 | Na | |
| 2013/0217380 | A1 * | 8/2013 | Seo | H04W 4/50 455/420 |
| 2014/0075039 | A1 | 3/2014 | Yang et al. | |
| 2014/0085486 | A1 | 3/2014 | Emura | |
| 2015/0271741 | A1 | 9/2015 | Li et al. | |

FOREIGN PATENT DOCUMENTS

| | | | |
|---|---|---|---|
| CN | 102246468 | A | 11/2011 |
| CN | 103002125 | A | 3/2013 |
| CN | 103069747 | A | 4/2013 |
| CN | 103124422 | A | 5/2013 |

OTHER PUBLICATIONS

Allegro et al., "UPnP Device Architecture 1.0," UPnP Forum, Document Revision Date Apr. 24, 2008, 80 pages.

Jeronimo et al., "UPnP Design by Example, A Software Developer's Guide to Universal Plug and Play," Intel Press, May 1, 2003, 19 pages.

"UPnP Device Architecture 1.1," UPnP Forum, Oct. 15, 2008, 136 pages.

"Wi-Fi Display Technical Specification," Draft Version 1.44, 2012, 159 pages.

"DLNA Guidelines, vol. 1: Architectures and Protocols, An Industry Guide for Building Interoperable Platforms, DeVices, and Applications,"Part 1, Aug. 2009, 385 pages.

"DLNA Guidelines, vol. 1: Architectures and Protocols, An Industry Guide for Building Interoperable Platforms, DeVices, and Applications,"Part 2, Aug. 2009, pp. I-XXIV, and 1-359.

Foreign Communication From a Counterpart Application, European Application No. 14816702.6, Extended European Search Report dated Dec. 18, 2015, 8 pages.

Foreign Communication From a Counterpart Application, PCT Application No. PCT/CN2014/080599, English Translation of International Search Report dated Sep. 29, 2014, 2 pages.

Foreign Communication From a Counterpart Application, PCT Application No. PCT/CN2014/080599, Written Opinion dated Sep. 29, 2014, 5 pages.

* cited by examiner

METHOD FOR IDENTIFYING DEVICE, AND DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

*More than one reissue application has been filed for reissue of U.S. Pat. No. 9,519,558 issued on Dec. 13, 2016.* This *is an* application *for reissue of U.S. Pat. No. 9,519,558, issued on Dec. 13, 2016, and is a continuation reissue of U.S. patent application Ser. No. 16/218,410, filed on Dec. 12, 2018, which is also an application for reissue of U.S. Pat. No. 9,519,558. U.S. Pat. No. 9,519,558* is a continuation of International *Patent* Application No. PCT/CN2014/080599, filed on Jun. 24, 2014, which claims priority to Chinese Patent Application No. 201310269569.3, filed on Jun. 28, 2013, which is hereby incorporated by reference in its entirety.

TECHNICAL FIELD

Embodiments of the present disclosure relate to communications technologies, and in particular, to a method for identifying a device, and a device.

BACKGROUND

In a digital home, various home electronic devices communicate and exchange data with each other in different interconnection modes on a basis of computer technologies and network technologies, which implements "interconnection and interworking" between home electronic products, and can implement functions such as content sharing or mutual control, so that comfortableness and entertainment of people's residence are significantly improved.

To implement media content sharing between electronic devices on a home network, the Universal Plug and Play (UPnP) Forum formulates a UPnP AV architecture standard. According to the standard, a control device is used as a UPnP control point, and a multimedia device is used as a UPnP device. After acquiring a go-online announcement message of the UPnP device, the UPnP control point further acquires device description information and service description information of the UPnP device, so that the UPnP control point may control the UPnP device by invoking an action command or a variable query command, or establish a connection between the control device and the multimedia device by invoking an action command, thereby implementing media file sharing.

There are an increasing number of electronic devices on a home network, and different devices have their own product models and product names. A user is always confused by irregular product models or naming rules made by manufacturers, and cannot correctly identify a multimedia device that a product model or a naming rule is corresponding to.

SUMMARY

Embodiments of the present disclosure provide a method for identifying a device, and a device, which enable a user to correctly identify a multimedia device.

According to a first aspect, an embodiment of the present disclosure provides a method for identifying a device, including generating, by a control device, an identification identifier of a multimedia device according to device description information of the multimedia device, and sending the identification identifier to the multimedia device, so that the multimedia device displays the identification identifier, acquiring, by the control device, the identification identifier displayed by the multimedia device and an appearance image of the multimedia device, and acquiring the device description information according to the identification identifier displayed by the multimedia device, and associating, by the control device, the device description information with the appearance image of the multimedia device, so that a user equipment identifies the multimedia device according to the appearance image.

With reference to the first aspect, in a first possible implementation manner of the first aspect, the acquiring, by the control device, the device description information according to the identification identifier displayed by the multimedia device includes determining, by the control device, that the identification identifier displayed by the multimedia device is consistent with the identification identifier generated by the control device, and acquiring the device description information corresponding to the identification identifier generated by the control device.

With reference to the first aspect or the first possible implementation manner of the first aspect, in a second possible implementation manner of the first aspect, before the generating, by the control device, the identification identifier of the multimedia device according to the device description information of the multimedia device, the method further includes acquiring, by the control device, the device description information and device capability information of the multimedia device, and determining, by the control device according to the device description information and the device capability information, that the multimedia device is a video device or an audio device.

With reference to the second possible implementation manner of the first aspect, in a third possible implementation manner of the first aspect, if the multimedia device is the video device, the identification identifier is a preset picture or a two-dimensional code, or if the multimedia device is the audio device, the identification identifier is preset music, or a sound with a preset frequency.

With reference to the first aspect or any one of the first to the third possible implementation manners of the first aspect, in a fourth possible implementation manner of the first aspect, where the generating, by the control device, the identification identifier of the multimedia device according to the device description information of the multimedia device includes generating, by the control device, the identification identifier of the multimedia device according to a universally unique identifier (UUID) and an Internet Protocol (IP) address of the multimedia device in the device description information of the multimedia device, and the associating, by the control device, the device description information with the appearance image of the multimedia device includes associating, by the control device, the UUID and the IP address with the appearance image of the multimedia device.

With reference to the first aspect or any one of the first to the fourth possible implementation manners of the first aspect, in a fifth possible implementation manner of the first aspect, where the acquiring, by the control device, the appearance image of the multimedia device includes acquiring, by the control device, an appearance image of the multimedia device by using a camera.

According to a second aspect, an embodiment of the present disclosure provides a method for identifying a device, including receiving, by a multimedia device, an identification identifier of the multimedia device sent by a control device, and displaying, by the multimedia device, the identification identifier, so that the control device acquires device description information of the multimedia device according to the identification identifier and associates the device description information with the appearance image, where the identification identifier is generated by the control device according to the device description information of the multimedia device.

With reference to the second aspect, in a first possible implementation manner of the second aspect, if the multimedia device is a video device, the identification identifier is a preset picture or a two-dimensional code, or if the multimedia device is an audio device, the identification identifier is preset music, or a sound with a preset frequency.

According to a third aspect, an embodiment of the present disclosure provides a method for identifying a device, including acquiring, by a control device, device description information and device capability information of a multimedia device, acquiring, by the control device, an appearance image of the multimedia device, and associating, by the control device, the device description information with the appearance image of the multimedia device, so that a user equipment identifies the multimedia device according to the appearance image.

With reference to the third aspect, in a first possible implementation manner of the third aspect, the acquiring, by the control device, the appearance image of the multimedia device includes acquiring, by the control device, an appearance image of the multimedia device from a network side by using the device description information, and acquiring an appearance image of the multimedia device by using a camera, and determining, by the control device, that the appearance image of the multimedia device acquired from the network side by using the device description information is consistent with the appearance image of the multimedia device acquired by using the camera.

With reference to the third aspect or the first possible implementation manner of the third aspect, in a second possible implementation manner of the third aspect, the associating, by the control device, the device description information with the appearance image of the multimedia device, so that a user identifies the multimedia device according to the appearance image includes associating, by the control device, a UUID and an IP address in the device description information with the appearance image of the multimedia device acquired by using the camera.

With reference to the third aspect or any one of the first and the second possible implementation manners of the third aspect, in a third possible implementation manner of the third aspect, after the acquiring, by the control device, the device description information of the multimedia device, the method further includes determining, by the control device according to the device description information and the device capability information, that the multimedia device is a video device or an audio device.

According to a fourth aspect, an embodiment of the present disclosure provides a control device, including a generating module configured to generate an identification identifier of a multimedia device according to device description information of the multimedia device, and send the identification identifier to the multimedia device, so that the multimedia device displays the identification identifier, a first acquiring module configured to acquire the identification identifier displayed by the multimedia device and an appearance image of the multimedia device, a second acquiring module configured to acquire the device description information according to the identification identifier displayed by the multimedia device, and an associating module configured to associate the device description information with the appearance image of the multimedia device, so that a user equipment identifies the multimedia device according to the appearance image.

With reference to the fourth aspect, in a first possible implementation manner of the fourth aspect, the second acquiring unit is configured to determine that the identification identifier displayed by the multimedia device is consistent with the identification identifier generated by the control device, and acquire the device description information corresponding to the identification identifier generated by the control device.

With reference to the fourth aspect or the first possible implementation manner of the fourth aspect, in a second possible implementation manner of the fourth aspect, the control device further includes a determining module configured to, before the identification identifier of the multimedia device is generated according to the device description information of the multimedia device, acquire the device description information and device capability information of the multimedia device, and determine, according to the device description information and the device capability information, that the multimedia device is a video device or an audio device.

With reference to the second possible implementation manner of the fourth aspect, in a third possible implementation manner of the fourth aspect, if the multimedia device is the video device, the identification identifier is a preset picture or a two-dimensional code, or if the multimedia device is the audio device, the identification identifier is preset music, or a sound with a preset frequency.

With reference to the fourth aspect or any one of the first to the third possible implementation manners of the fourth aspect, in a fourth possible implementation manner of the fourth aspect, the generating module is configured to generate the identification identifier of the multimedia device according to a UUID and an IP address of the multimedia device in the device description information of the multimedia device, and the associating module is configured to associate the UUID and the IP address with the appearance image of the multimedia device.

With reference to the fourth aspect or the first to the fourth possible implementation manners of the fourth aspect, in a fifth possible implementation manner of the fourth aspect, the first acquiring module is configured to acquire the identification identifier displayed by the multimedia device, and acquire the appearance image of the multimedia device by using a camera.

According to a fifth aspect, an embodiment of the present disclosure provides a multimedia device, including a receiving module configured to receive an identification identifier of the multimedia device sent by a control device, and a displaying module configured to display the identification identifier, so that the control device acquires device description information of the multimedia device according to the identification identifier and associates the device description information with the appearance image, where the identification identifier is generated by the control device according to the device description information of the multimedia device.

With reference to the fifth aspect, in a first possible implementation manner of the fifth aspect, if the multimedia device is a video device, the identification identifier is a preset picture or a two-dimensional code, or if the multimedia device is an audio device, the identification identifier is preset music, or a sound with a preset frequency.

According to a sixth aspect, an embodiment of the present disclosure provides a control device, including a first acquiring module configured to acquire device description information and device capability information of a multimedia device, a second acquiring module configured to acquire an appearance image of the multimedia device, and an associating module configured to associate the device description information with the appearance image of the multimedia device, so that a user equipment identifies the multimedia device according to the appearance image.

With reference to the sixth aspect, in a first possible implementation manner of the sixth aspect, the second acquiring unit is configured to acquire an appearance image of the multimedia device from a network side by using the device description information, and acquire an appearance image of the multimedia device by using a camera, and determine that the appearance image of the multimedia device acquired from the network side by using the device description information is consistent with the appearance image of the multimedia device acquired by using the camera.

With reference to the sixth aspect or the first possible implementation manner of the sixth aspect, in a second possible implementation manner of the sixth aspect, the associating module is configured to associate, by the control device, a UUID and an IP address in the device description information with the appearance image of the multimedia device acquired by using the camera.

With reference to the sixth aspect or any one of the first and the second possible implementation manners of the sixth aspect, in a third possible implementation manner of the sixth aspect, the control device further includes a determining module configured to, after the device description information of the multimedia device is acquired, determine, according to the device description information and the device capability information, that the multimedia device is a video device or an audio device.

The embodiments of the present disclosure provide a method for identifying a device, and a device. In the method for identifying a device, a control device generates an identification identifier of a multimedia device according to device description information of the multimedia device, and sends the identification identifier to the multimedia device, so that the multimedia device displays the identification identifier; the control device acquires the identification identifier displayed by the multimedia device and an appearance image of the multimedia device, and acquires the device description information according to the identification identifier displayed by the multimedia device; and the control device associates the device description information with the appearance image of the multimedia device, so that a user equipment identifies the multimedia device according to the appearance image. In this way, a user equipment can correctly identify, only according to the appearance image of the multimedia device, the multimedia device corresponding to the appearance image, thereby improving convenience and correctness of device identification.\

BRIEF DESCRIPTION OF DRAWINGS

To describe the technical solutions in the embodiments of the present disclosure more clearly, the following briefly introduces the accompanying drawings required for describing the embodiments. The accompanying drawings in the following description show some embodiments of the present disclosure, and persons of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. The described embodiments are some but not all of the embodiments of the present disclosure. All other embodiments obtained by persons of ordinary skill in the art based on the embodiments of the present disclosure without creative efforts shall fall within the protection scope of the present disclosure.

Figure 1:
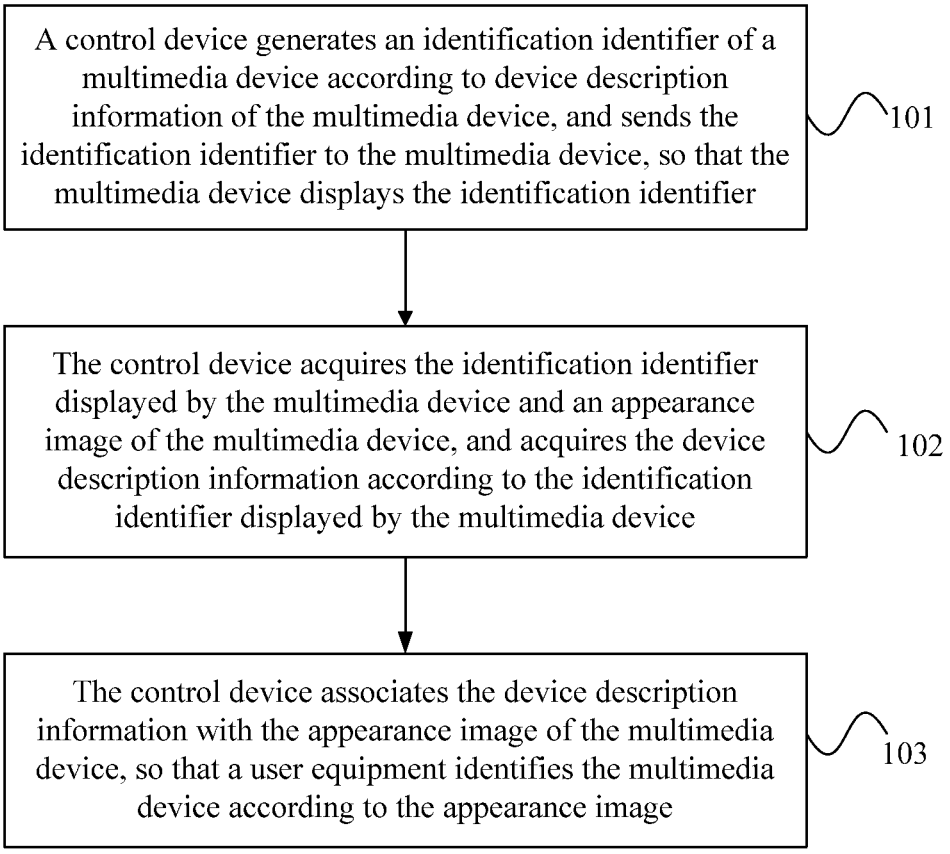
FIG. 1 is a flowchart of Embodiment 1 of a method for identifying a device according to the present disclosure.

FIG. 1 is a flowchart of Embodiment 1 of a method for identifying a device according to the present disclosure. As shown in FIG. 1, the method for identifying a device according to this embodiment of the present disclosure may be executed by a control device. The control device may be implemented by using software and/or hardware. The method for identifying a device according to this embodiment includes Step 101: The control device generates an identification identifier of a multimedia device according to device description information of the multimedia device, and sends the identification identifier to the multimedia device, so that the multimedia device displays the identification identifier.

Step 102: The control device acquires the identification identifier displayed by the multimedia device and an appearance image of the multimedia device, and acquires the device description information according to the identification identifier displayed by the multimedia device.

Step 103: The control device associates the device description information with the appearance image of the multimedia device, so that a user equipment identifies the multimedia device according to the appearance image.

In this embodiment, the control device may be an interactive terminal device, such as a mobile phone, a notebook computer, or a tablet computer, that can take photos, can be networked, and supports wireless connection. The multimedia device may be an interactive device, such as a television, sound equipment, or a notebook computer, that can be networked and can output a video or audio.

During a specific implementation process, before step 101, the control device acquires the device description information and device capability information of the multimedia device; and the control device determines, according to the device description information and the device capability information, that the multimedia device is a video device or an audio device.

The control device acquires the device description information of the multimedia device by using the Simple Service Discovery Protocol (SSDP), and there may be two possible cases. One possible case is that, when connected to a network, the control device may send an "ssdp:discover" message to an SSDP port at a specific multicast address, where the message includes a request for acquiring the device description information; and when the multimedia device obtains the message by listening, the multimedia device analyzes the request sent by the control device, and then returns a response with respect to the request sent by the control device, that is, returns the device description information. The other case is that, when connected to a network, the multimedia device sends an "ssdp:alive" message to an SSDP port at a specific multicast address, where the message includes the device description information.

The device description information includes a series of general attributes of the multimedia device. The general attributes include a service, a device structure, a device attribute, for example, a UUID, an IP address, and a device type of the multimedia device. A value of a UUID for a same multimedia device is unique at different times. A form of a UUID may be as follows: uuid:d1578360-feb3-1167-1000-2c27d742936c; a form of an IP address may be as follows: HOST:239.255.255.250:1900; and a form of a device type may be as follows: device:Media Renderer. For a specific form of other device description information, details are not described in this embodiment again.

After the control device discovers the multimedia device, the control device may invoke a UPnP acquire action (Get ProtocolInfo( ) action) to acquire the device capability information. A packet of the device capability information that is of the multimedia device and is acquired by the control device may be shown as follows:

```
<SinkProtocolInfo>
http-get:*:image/jpeg:DLNA.ORG_PN=JPEG_SM,
http-get:*:audio/mpeg:DLNA.ORG_PN=MP3,
</SinkProtocolInfo>
```

In the acquired device capability information, image represents an image, jpeg represents a format of an image file, audio represents a sound, and mpeg represents a format of an audio file. Persons skilled in the art may understand that the foregoing format of the packet of the device capability information is merely exemplary, and this embodiment is not limited thereto.

The multimedia device may determine, according to the device description information and the device capability information, that the multimedia device is a video device or an audio device. For example, the device type is a media renderer and the device capability information is image/jpeg, it may be determined that the multimedia device is a video device; and if the device capability information is audio/mpeg, it may be determined that the multimedia device is an audio device.

In step 101, the control device generates an identification identifier of the multimedia device according to device description information of the multimedia device.

During a specific implementation process, the control device may generate the identification identifier of the multimedia device according to the device description information of the multimedia device, where the device description information may be a UUID, an IP address, and a device type. The identification identifier may be a picture with a specific color, a two-dimensional code, a sound, a specific shape, or the like.

Optionally, the control device generates the identification identifier of the multimedia device according to a UUID and an IP address of the multimedia device in the device description information of the multimedia device.

After the identification identifier of the multimedia device is generated, the control device sends the identification identifier to the multimedia device, so that the multimedia device acquires the identification identifier. The control device sends a universal resource identifier (URI) of the identification identifier to the multimedia device, and the multimedia device may acquire the identification identifier according to the URI.

In step 102, the control device acquires the identification identifier displayed by the multimedia device and an appearance image of the multimedia device, and acquires the device description information according to the identification identifier displayed by the multimedia device.

When the multimedia device is a video device, the control device may capture, in a manner of photographing or scanning, an identification identifier played by the video device; and when the multimedia device is an audio device, the control device may acquire, in a manner of recording by a microphone, an identification identifier played by the audio device, and then acquire the device description information according to a picture with a specific color, a two-dimensional code, a sound, a specific shape, or the like.

In addition, the multimedia device acquires an appearance image of the multimedia device by using a camera, learns whether the media playback device is a video device or an audio device by means of an image recognition technology, and then learns appearance information such as a brand and a screen size of the multimedia device by analyzing the multimedia device.

In step 103, the control device associates the device description information with the appearance image of the multimedia device, so that a user equipment identifies the multimedia device according to the appearance image.

During a specific implementation process, the device description information may be associated with the appearance image of the multimedia device in a manner of establishing a table, mapping, or binding, and association information is stored on the control device.

Optionally, the control device may associate the UUID and the IP address in the device description information with the appearance image.

When a user equipment needs to implement media content sharing between electronic devices on a home network, the user equipment may identify and select a multimedia device according to appearance images of multimedia devices displayed on the control device. Because an association relationship exists between an appearance image and device description information, after the user equipment identifies and selects the multimedia device according to the appearance images, the control device may directly acquire device description information of the multimedia device, and then establishes a connection with the multimedia device according to the device description information, thereby implementing media file sharing.

In the method for identifying a device according to this embodiment of the present disclosure, a control device generates an identification identifier of a multimedia device according to device description information of the multimedia device, and sends the identification identifier to the multimedia device, so that the multimedia device displays the identification identifier; the control device acquires the identification identifier displayed by the multimedia device and an appearance image of the multimedia device, and acquires the device description information according to the identification identifier displayed by the multimedia device; and the control device associates the device description information with the appearance image of the multimedia device, so that a user equipment identifies the multimedia device according to the appearance image. In this way, a user equipment can correctly identify, only according to the appearance image of the multimedia device, the multimedia device corresponding to the appearance image, thereby improving convenience and correctness of device identification.

The following uses several specific embodiments to describe, with respect to the video device and the audio device in the embodiment shown in FIG. 1, in detail the method for identifying a device.

Figure 2:
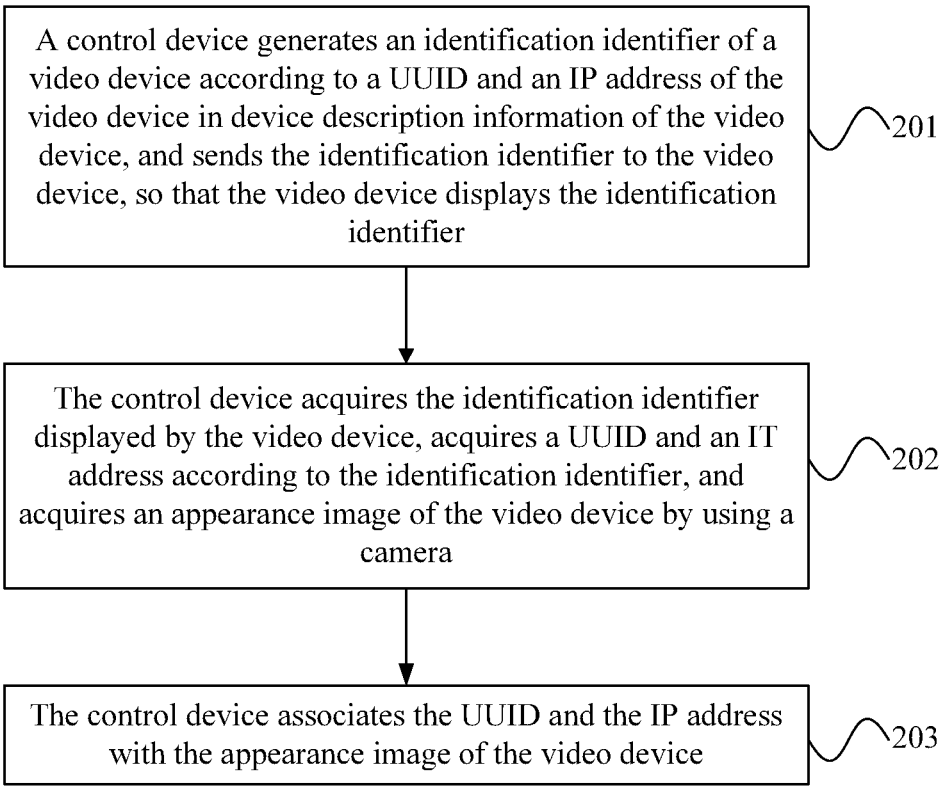
FIG. 2 is a flowchart of a process, in Embodiment 1 of a method for identifying a device, for identifying a video device according to the present disclosure.

FIG. 2 is a flowchart of a process, in Embodiment 1 of a method for identifying a device, for identifying a video device according to the present disclosure. That a multimedia device is a video device is described in detail for description in this embodiment. Specific steps are as follows. Step 201: A control device generates an identification identifier of the video device according to a UUID and an IP address of the video device in device description information of the video device, and sends the identification identifier to the video device, so that the video device displays the identification identifier.

For a method used by the control device to discover and determine a video device, and a method for acquiring device description information and device capability information, reference may be made to step 101, and details are not described herein again in this embodiment.

When the multimedia device is a video device, the control device compiles information such as the UUID and the IP address of the video device into a two-dimensional code for the video device. If multiple video devices are discovered on a home network, UUIDs and IP addresses of the video devices are different, and therefore, two-dimensional codes generated for the video devices are also different.

Alternatively, the control device may also generate, according to UUIDs and IP addresses of different video devices discovered on the home network, pictures with preset colors for the different video devices. For example, if a video device with a UUID of xx.1xx.xxx.1 and with an IP address of 192.168.xx.1 is acquired by the control device, the control device generates a red picture for the video device; and if a video device with a UUID of xx.1xx.xxx.2 and with an IP address of 192.168.xx.2 is acquired by the control device, the control device generates a blue picture for the video device. The control device generates two-dimensional codes or pictures with preset colors for video devices with different UUIDs and IP addresses.

Persons skilled can understand that both the foregoing two-dimensional code and the picture with a preset color are identification identifiers in this embodiment.

When the multimedia device is a video playback device, the control device invokes a Set AV Transport URI( ) action command of the video device, where the command carries a URI of a picture with a preset color or a URI of a two-dimensional code, where the picture with a preset color or the two-dimensional code is generated for the video device. After acquiring the URI of the picture with a preset color or the URI of the two-dimensional code, the video device acquires the picture with a preset color or the two-dimensional code by using Hypertext Transfer Protocol (HTTP) GET method call, and displays the picture with a preset color or the two-dimensional code on a screen.

Step 202: The control device acquires the identification identifier displayed by the video device, acquires the UUID and the IP address according to the identification identifier, and acquires an appearance image of the video device by using a camera.

When the multimedia device is a video device, the camera on the control device captures the appearance image of the video playback device, and captures a preset picture or a two-dimensional code picture in a manner of photographing or scanning.

When the identification identifier is a two-dimensional code picture, the UUID and the IP address may be directly acquired by parsing.

When the identification identifier is a preset picture, the preset picture may be a picture with a preset pattern, or may be a picture with a preset color. If the control device determines that a preset picture played by the video device is consistent with a preset picture generated by the control device, the control device acquires device description information corresponding to the preset picture. The control device determines whether the captured preset picture played by the video device is a preset picture generated by an audio device; and if the captured preset picture played by the video device is a preset picture generated by an audio device, the control device determines that the identification identifier played by the video device is consistent with the identification identifier generated by the control device.

In addition, the control device may learn that the multimedia device is a video device according to an appearance image by means of an image recognition technology, and then learns appearance information such as a brand and a screen size of the multimedia device by analyzing the multimedia device.

Step 203: The control device associates the UUID and the IP address with the appearance image of the video device.

After the camera of the control device captures the appearance image of the video device and key information such as the UUID and the IP address of the video device is acquired, the control device matches and associates the appearance image of the video device with the UUID and the IP address. For example, the control device correspondingly binds the appearance image of the video device collected by the video device and a red picture with a corresponding UUID and a corresponding IP address, and the binding information is stored on the control device. A manner for associating device description information with an appearance image in a form of a table may be listed in Table 1.

TABLE 1

| UUID | IP | Generated picture with preset color | Acquired picture with preset color | Appearance picture |
|---|---|---|---|---|
| xx.1xx.xxx.1 | 192.168.xx.1 | Red | Red | HDTV1 |
| xx.1xx.xxx.2 | 192.168.xx.3 | Yellow | Yellow | HDTV1 |
| xx.1xx.xxx.3 | 192.168.xx.2 | Blue | Blue | HDTV1 |

By using the method for identifying a device according to this embodiment of the present disclosure, a user equipment can correctly identify, only according to an appearance image of a multimedia device, the multimedia device corresponding to the appearance image, thereby improving convenience and correctness of device identification.

Figure 3:
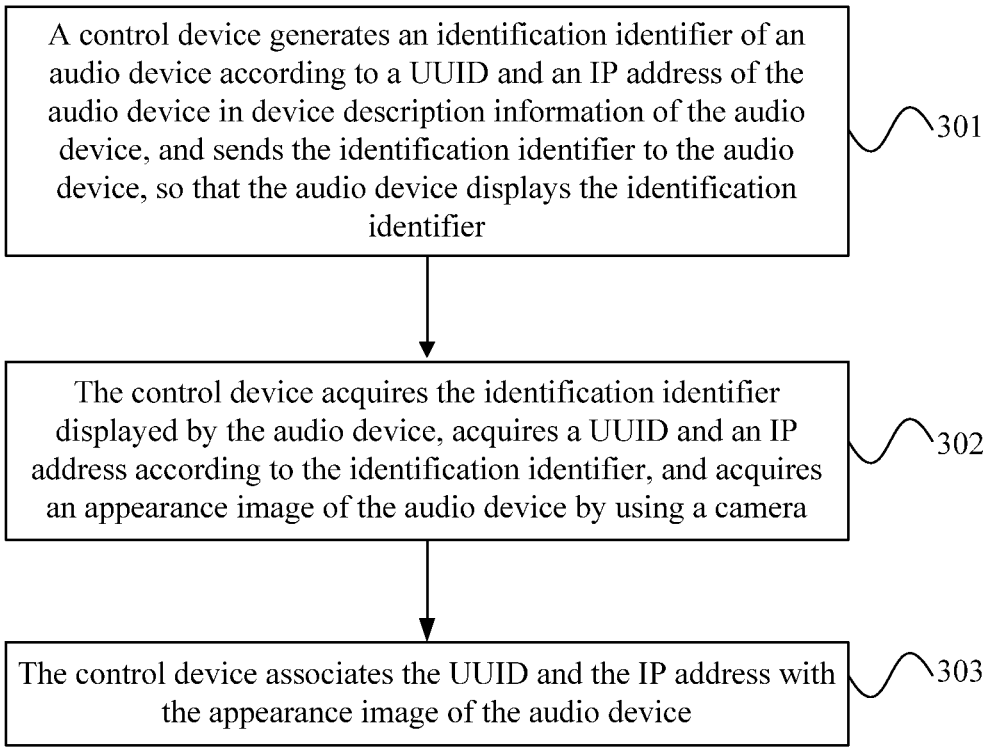
FIG. 3 is a flowchart of a process, in Embodiment 1 of a method for identifying a device, for identifying an audio device according to the present disclosure.

FIG. 3 is a flowchart of a process, in Embodiment 1 of a method for identifying a device, for identifying an audio device according to the present disclosure. That a multimedia device is an audio device is described in detail in this embodiment.

Step 301: A control device generates an identification identifier of the audio device according to a UUID and an IP address of the audio device in device description information of the audio device, and sends the identification identifier to the audio device, so that the audio device displays the identification identifier.

For a method used by the control device to discover and determine an audio device, and a method for acquiring device description information and device capability information, reference may be made to step 101, and details are not described herein again in this embodiment.

When the multimedia device is an audio device, the control device may generate, according to UUIDs and IP addresses of different audio devices discovered on a home network, preset music for the different video devices. For example, if an audio device with a UUID of xx.1xx.xxx.1 and with an IP address of 192.168.xx.1 is acquired by the control device, the control device generates music A for the audio device. If an audio device with a UUID of xx.1xx.xxx.2 and with an IP address of 192.168.xx.2 is acquired by the control device, the control device generates music B for the audio device.

Alternatively, the control device may generate audio files with preset frequencies according to the UUIDs and the IP addresses of the different video devices, for example, the control device generates an audio file with a frequency of 1000 kHz for a device with a UUID of xx.1xx.xxx.1 and with an IP address of 192.168.xx.1, and the control device generates an audio file with a frequency of 2000 kHz for a device with a UUID of xx.1xx.xxx.2 and with an IP address of 192.168.xx.2.

Persons skilled in the art can understand that both the foregoing preset music and a sound with a preset frequency are identification identifiers in this embodiment.

When the multimedia device is an audio playback device, the control device invokes a Set AV Transport URI( ) action command of the audio device, where the command carries a URI of preset music or a URI of a sound with a preset frequency, where the preset music or the sound with a preset frequency is generated for the audio device. After acquiring the URI of the preset music or the URI of the sound with a preset frequency, the playback device acquires the preset music or the sound with a preset frequency by using HTTP GET, and plays the preset music or the sound with a preset frequency by using sound equipment.

Step 302: The control device acquires the identification identifier displayed by the audio device, acquires the UUID and the IP address according to the identification identifier, and acquires an appearance image of the audio device by using a camera.

When the multimedia device is an audio device, a microphone on the control device collects preset music, or a sound with a preset frequency played by the audio device. For example, the control device generates music A or an audio file with 1000 kilohertz (kHz) for an audio device with a UUID of xx.1xx.xxx.1 and with an IP address of 192.168.xx.1. When a user puts the control device near the audio device, a camera on the control device acquires an appearance image of the audio device, and the microphone captures that what is playing by the audio device is music A or the audio file with 1000 kHz.

Then, if the control device determines that the preset music and the sound with a preset frequency played by the audio device is consistent with the preset music and the sound with a preset frequency generated by the control device, the control device acquires device description information corresponding to the preset music and the sound with a preset frequency. The control device determines whether the collected preset music or the sound with a preset frequency played by the audio device is the preset music or the sound with a preset frequency generated by the control device; and if the collected preset music or the sound with a preset frequency played by the audio device is the preset music or the sound with a preset frequency generated by the control device, the control device determines that the identification identifier played by the audio device is consistent with the identification identifier generated by the control device.

In addition, the control device learns that the multimedia device is an audio device by means of an image recognition technology, and then learns appearance information such as a brand and a screen size of the multimedia device by analyzing the multimedia device.

Step 303: The control device associates the UUID and the IP address with the appearance image of the audio device.

The control device matches and associates key information, such as the UUID and the IP address of the audio device that are corresponding to the preset music or the sound with a preset frequency, with the appearance image of the audio device collected by the camera of the control device; and the association information is stored on the control device. A manner for associating device description information with an appearance image in a form of a table may be listed in Table 2.

TABLE 2

| UUID | IP | Generated sound with preset frequency | Acquired sound with preset frequency | Appearance picture |
|---|---|---|---|---|
| xx.1xx.xxx.1 | 192.168.xx.1 | A/1000 kHz | A/1000 kHz | Stereo speaker1 |
| xx.1xx.xxx.2 | 192.168.xx.3 | A/1000 kHz | A/1000 kHz | Stereo speaker2 |
| xx.1xx.xxx.3 | 192.168.xx.2 | A/1000 kHz | A/1000 kHz | Stereo speaker3 |

By using the method for identifying a device according to this embodiment of the present disclosure, a user equipment can correctly identify, only according to an appearance image of a multimedia device, the multimedia device corresponding to the appearance image, thereby improving convenience and correctness of device identification.

Figure 4:
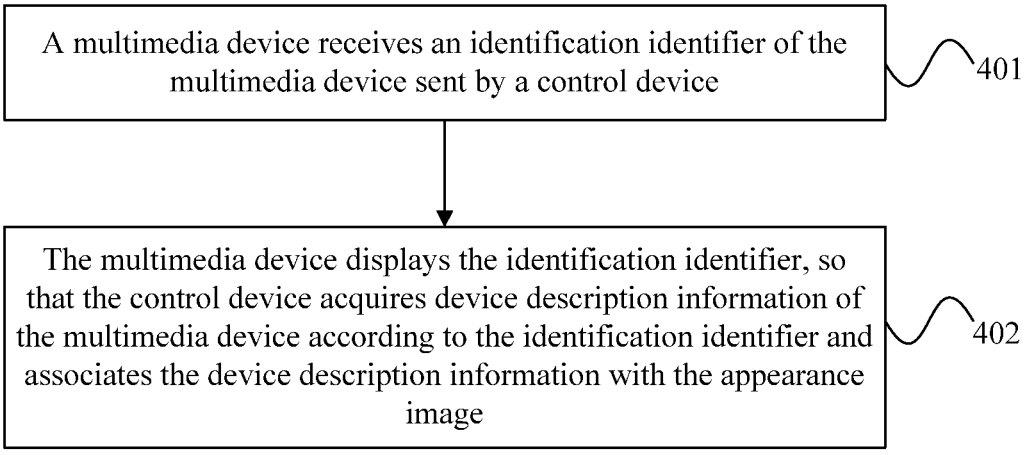
FIG. 4 is a flowchart of Embodiment 2 of a method for identifying a device according to the present disclosure.

FIG. 4 is a flowchart of Embodiment 2 of a method for identifying a device according to the present disclosure. As shown in FIG. 4, the method for identifying a device according to this embodiment of the present disclosure may be executed by a multimedia device. The multimedia device may be implemented by using software and/or hardware. The method for identifying a device according to this embodiment includes Step 401: The multimedia device receives an identification identifier of the multimedia device sent by a control device.

Step 402: The multimedia device displays the identification identifier, so that the control device acquires device description information of the multimedia device according to the identification identifier and associates the device description information with the appearance image, where the identification identifier is generated by the control device according to the device description information of the multimedia device.

Optionally, if the multimedia device is a video device, the identification identifier is a preset picture or a two-dimensional code.

Optionally, if the multimedia device is an audio device, the identification identifier is preset music, or a sound with a preset frequency.

For a specific implementation process of this embodiment, reference may be made to descriptions about the multimedia device shown in the embodiments of FIG. 1 to FIG. 3, and details are not described herein again in this embodiment.

In the method for identifying a device according to this embodiment of the present disclosure, a multimedia device receives an identification identifier of the multimedia device sent by a control device; and the multimedia device displays the identification identifier, so that the control device associates the device description information with the appearance image, which enables a user equipment to identify the multimedia device according to the appearance image. In this way, a user equipment can correctly identify, only according to the appearance image of the multimedia device, the multimedia device corresponding to the appearance image, thereby improving convenience and correctness of device identification.

Figure 5:
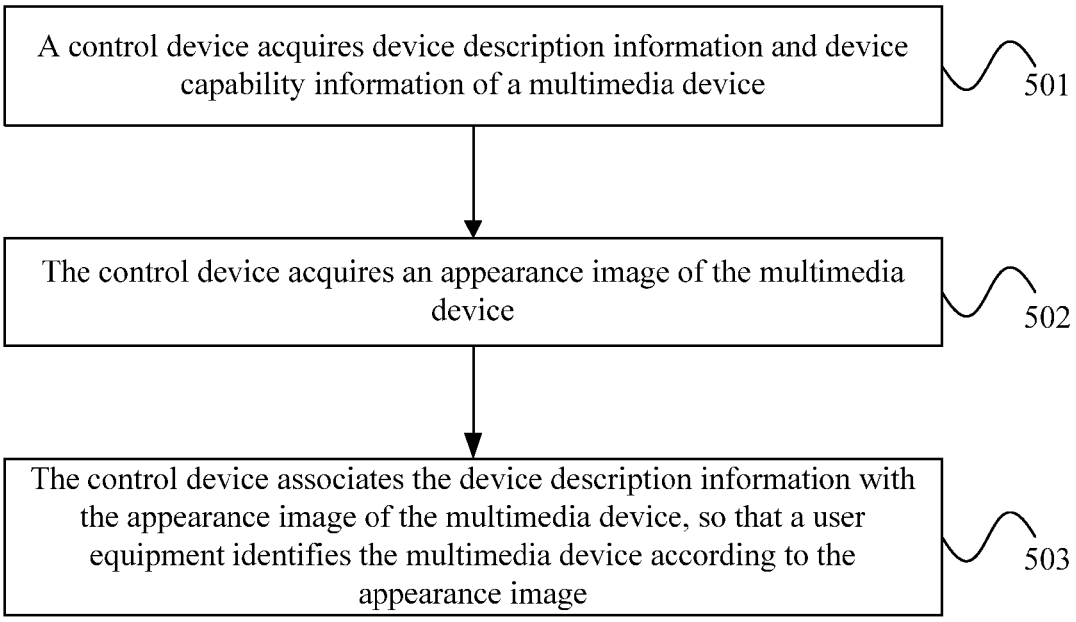
FIG. 5 is a flowchart of Embodiment 3 of a method for identifying a device according to the present disclosure.

FIG. 5 is a flowchart of Embodiment 3 of a method for identifying a device according to the present disclosure. The method for identifying a device according to this embodiment is as follows. Step 501: A control device acquires device description information and device capability information of a multimedia device.

Step 502: The control device acquires an appearance image of the multimedia device.

Step 503: The control device associates the device description information with the appearance image of the multimedia device, so that a user equipment identifies the multimedia device according to the appearance image.

In step 501, the control device acquires device description information and device capability information of a multimedia device by using the Service Discovery Protocol.

The control device may acquire the device description information of the multimedia device by using SSDP, and there may be two possible cases. One possible case is that when connected to a network, the control device may send an "ssdp:discover" message to an SSDP port at a specific multicast address, where the message includes a request for acquiring the device description information; and when the multimedia device obtains the message by listening, the multimedia device analyzes the request sent by the control device, and then returns a response with respect to the request sent by the control device, that is, returns the device description information. The other case is that when connected to a network, the multimedia device sends an "ssdp: alive" message to an SSDP port at a specific multicast address, where the message includes the device description information.

After the control device discovers the multimedia device, the control device may invoke a UPnP acquire action (Get ProtocolInfo( ) action) to acquire the device capability information.

Optionally, after the control device acquires the device description information of the multimedia device, the method further includes determining, by the control device according to the device description information and the device capability information, that the multimedia device is a video device or an audio device.

In step 502, the control device acquires an appearance image of the multimedia device. The control device acquires an appearance image of the multimedia device from a network side by using the device description information, and acquires an appearance image of the multimedia device by using a camera; and the control device determines that the appearance image of the multimedia device acquired from the network side by using the device description information is consistent with the appearance image of the multimedia device acquired by using a camera. The control device uses the appearance image of the multimedia device acquired from the network side as an appearance image of the multimedia device, and acquires the appearance image.

The control device acquires more detailed device information from the network side by analyzing key information in the device description information. For example, a uniform resource locator (URL) of a product appearance image is acquired from the device description information, and then the control device acquires the appearance image from the network side according to the URL; or, the control device may acquire a portal website of a device manufacturer by analyzing <manufacturer URL> in the device description information, and may acquire a detailed product model by analyzing <model Name> in the device description information. After acquiring a portal website of the manufacturer, the control device may search for more detailed device description information and product description information on the website by using a background program, for example, product parameters such as an appearance image, a brand, a screen size, and a resolution. The control device binds a UUID and an IP address of the multimedia device with the product parameters, such as the appearance image, the brand, and the screen size, of the multimedia device acquired from the network side, and the control device stores binding information. Details may be listed in Table 3.

TABLE 3

| UUID | IP | Appearance picture on network |
|---|---|---|
| xx.1xx.xxx.1 | 192.168.xx.1 | Samsung smart TV |
| xx.1xx.xxx.2 | 192.168.xx.3 | B&W sound equipment |
| xx.1xx.xxx.3 | 192.168.xx.2 | Sony high-definition TV |

The camera on the control device collects an appearance image of a multimedia device that needs to be identified. For example, a user starts the camera on the control device and aligns the camera with a multimedia device in a living room or a bedroom, and the camera collects an appearance image of the multimedia device, such as an appearance image of a television or an appearance image of sound equipment. The control device analyzes the collected appearance image of the multimedia device. The control device can learn, by means of image recognition, whether the appearance image acquired by using a camera by the user is a television or sound equipment. The control device may identify information such as a screen size of the multimedia device by means of an image recognition technology. Details may be listed in Table 4.

TABLE 4

| ID | Photographed appearance picture |
|---|---|
| A | Samsung smart TV |
| B | B&W sound equipment |
| C | Sony high-definition TV |

The control device performs analysis by means of an image recognition technology; if it is determined that the appearance image of the multimedia device acquired from the network side is consistent with the appearance image acquired by using a camera, the appearance image acquired by using a camera is used as an appearance image; and the appearance image is acquired. Persons skilled in the art may understand that consistency of appearance images not only includes consistency of images, but also includes consistency of device types, brands, and product parameters that are acquired according to the image recognition technology.

In step 503, the control device associates the device description information with the appearance image.

The control device associates the UUID and the IP address in the device description information with the appearance image acquired by using a camera in step 502, and stores the association information on the control device. A manner for associating device description information with an appearance image in a form of a table may be listed in Table 5.

TABLE 5

| UUID | IP | Appearance picture on network | Photographed appearance picture |
|---|---|---|---|
| xx.1xx.xxx.1 | 192.168.xx.1 | Samsung smart TV | Samsung smart TV |
| xx.1xx.xxx.2 | 192.168.xx.3 | B&W sound equipment | B&W sound equipment |
| xx.1xx.xxx.3 | 192.168.xx.2 | Sony high-definition TV | Sony high-definition TV |

By using the method for identifying a device according to this embodiment of the present disclosure, a user equipment can correctly identify, only according to an appearance image of a multimedia device, the multimedia device corresponding to the appearance image, thereby improving convenience and correctness of device identification.

Figure 6:
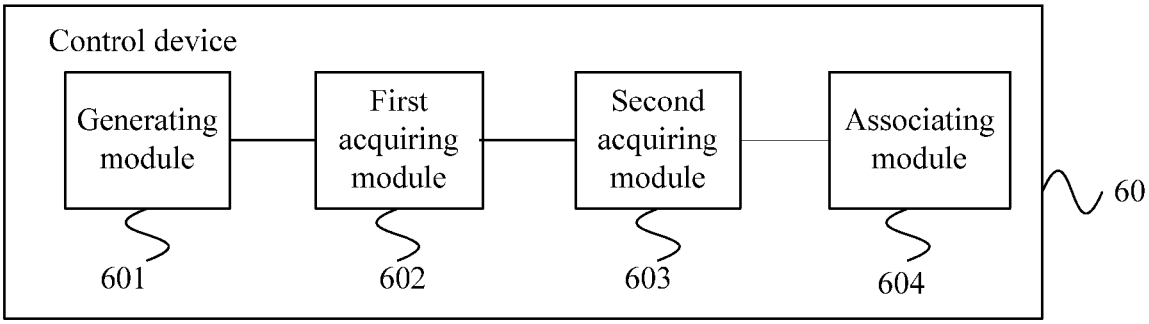
FIG. 6 is a schematic structural diagram of Embodiment 1 of a control device according to the present disclosure.

FIG. 6 is a schematic structural diagram of Embodiment 1 of a control device according to the present disclosure. As shown in FIG. 6, a control device 60 provided in this embodiment of the present disclosure includes a generating module 601, a first acquiring module 602, a second acquiring module 603, and an associating module 604.

The generating module 601 is configured to generate an identification identifier of a multimedia device according to device description information of the multimedia device, and send the identification identifier to the multimedia device, so that the multimedia device displays the identification identifier, the first acquiring module 602 is configured to acquire the identification identifier displayed by the multimedia device and an appearance image of the multimedia device, the second acquiring module 603 is configured to acquire the device description information according to the identification identifier displayed by the multimedia device, and the associating module 604 is configured to associate the device description information with the appearance image of the multimedia device, so that a user equipment identifies the multimedia device according to the appearance image.

The control device in this embodiment may be used to execute the technical solution of the method embodiment shown in FIG. 1. The implementation principles and technical effects are similar and are not described herein again.

Figure 7:
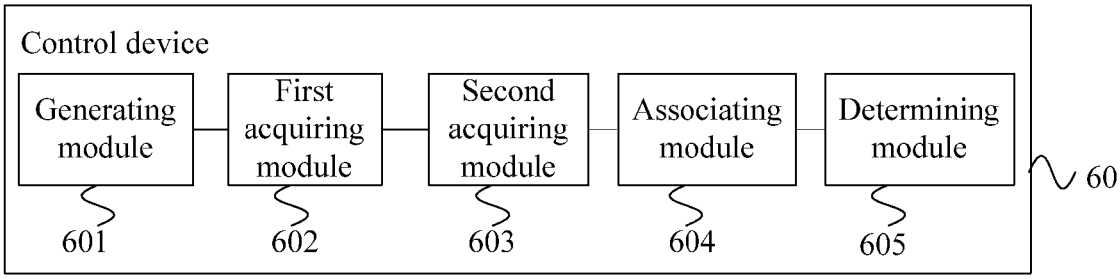
FIG. 7 is a schematic structural diagram of Embodiment 2 of a control device according to the present disclosure.

FIG. 7 is a schematic structural diagram of Embodiment 2 of a control device according to the present disclosure. As shown in FIG. 7, this embodiment of the present disclosure is implemented based on the embodiment of FIG. 6, and details are as follows. Optionally, the second acquiring module 603 is configured to determine that the identification identifier displayed by the multimedia device is consistent with the identification identifier generated by the control device, and acquire the device description information corresponding to the identification identifier generated by the control device.

Optionally, the control device further includes a determining module 605 configured to, before the identification identifier of the multimedia device is generated according to the device description information of the multimedia device, acquire the device description information and device capability information of the multimedia device, and determine, according to the device description information and the device capability information, that the multimedia device is a video device or an audio device.

Optionally, if the multimedia device is a video device, the identification identifier is a preset picture or a two-dimensional code, or if the multimedia device is an audio device, the identification identifier is preset music, or a sound with a preset frequency.

Optionally, the generating module 601 is configured to generate the identification identifier of the multimedia device according to a UUID and an IP address of the multimedia device in the device description information of the multimedia device, and the associating module 604 is configured to associate the UUID and the IP address with the appearance image of the multimedia device.

Optionally, the first acquiring module 602 is configured to acquire the identification identifier displayed by the multimedia device, and acquire the appearance image of the multimedia device by using a camera.

The control device in this embodiment may be used to execute the technical solutions of the foregoing method embodiments. The implementation principles and technical effects are similar and are not described herein again.

Figure 8:
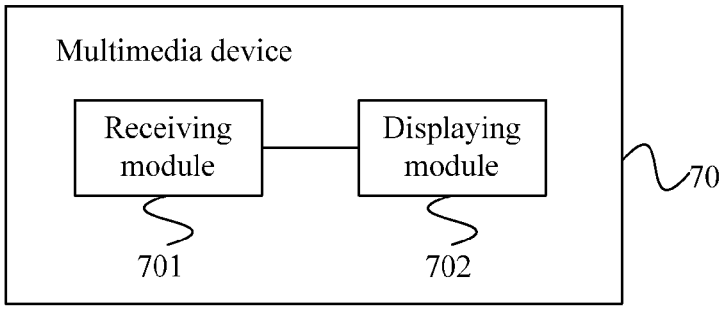
FIG. 8 is a schematic structural diagram of Embodiment 1 of a multimedia device according to the present disclosure.

FIG. 8 is a schematic structural diagram of Embodiment 1 of a multimedia device according to the present disclosure. As shown in FIG. 8, a multimedia device 70 provided in this embodiment of the present disclosure includes a receiving module 701 and a displaying module 702.

The receiving module 701 is configured to receive an identification identifier of the multimedia device sent by a control device, and the displaying module 702 is configured to display the identification identifier, so that the control device acquires device description information of the multimedia device according to the identification identifier and associates the device description information with the appearance image, where the identification identifier is generated by the control device according to the device description information of the multimedia device.

Optionally, if the multimedia device is a video device, the identification identifier is a preset picture or a two-dimensional code, or if the multimedia device is an audio device, the identification identifier is preset music, or a sound with a preset frequency.

The multimedia device in this embodiment may be used to execute the technical solution of the method embodiment shown in FIG. 4. The implementation principles and technical effects are similar and are not described herein again.

Figure 9:
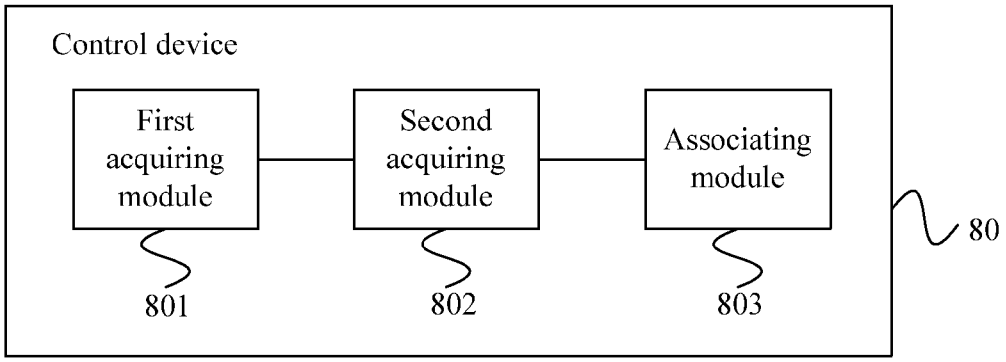
FIG. 9 is a schematic structural diagram of Embodiment 3 of a control device according to the present disclosure.

FIG. 9 is a schematic structural diagram of Embodiment 3 of a control device according to the present disclosure. As shown in FIG. 9, a control device 80 provided in this embodiment of the present disclosure includes a first acquiring module 801, a second acquiring module 802, and an associating module 803.

The first acquiring module 801 is configured to acquire device description information and device capability information of a multimedia device, the second acquiring module 802 is configured to acquire an appearance image of the multimedia device, and the associating module 803 is configured to associate the device description information with the appearance image of the multimedia device, so that a user equipment identifies the multimedia device according to the appearance image.

The control device in this embodiment may be used to execute the technical solution of the method embodiment shown in FIG. 5. The implementation principles and technical effects are similar and are not described herein again.

Figure 10:
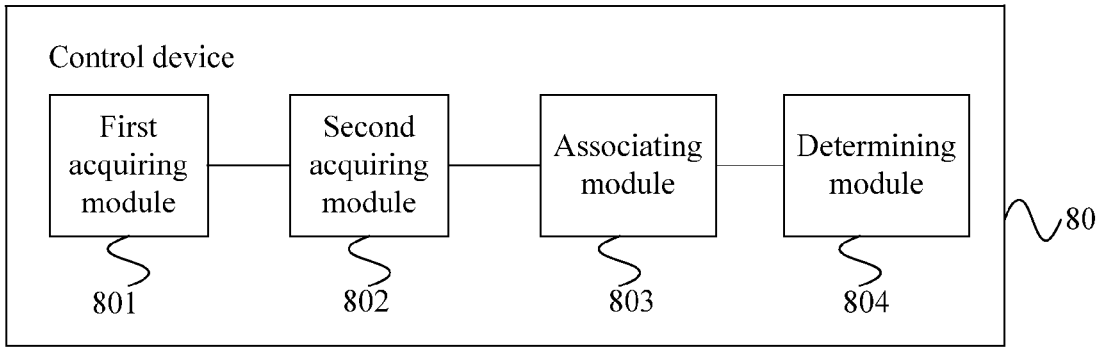
FIG. 10 is a schematic structural diagram of Embodiment 4 of a control device according to the present disclosure.

FIG. 10 is a schematic structural diagram of Embodiment 4 of a control device according to the present disclosure. As shown in FIG. 10, the control device provided in this embodiment of the present disclosure is implemented based on the embodiment in FIG. 9, and details are as follows Optionally, the second acquiring module 802 is configured to acquire an appearance image of the multimedia device from a network side by using the device description information, and acquire an appearance image of the multimedia device by using a camera, and determine that the appearance image of the multimedia device acquired from the network side by using the device description information is consistent with the appearance image of the multimedia device acquired by using the camera.

Optionally, the associating module 803 is configured to associate, by the control device, a UUID and an IP address in the device description information with the appearance image of the multimedia device acquired by using the camera.

Optionally, the control device further includes a determining module 804 configured to, after the device description information of the multimedia device is acquired, determine, according to the device description information and the device capability information, that the multimedia device is a video device or an audio device.

The control device in this embodiment may be used to execute the technical solutions of the foregoing method embodiments. The implementation principles and technical effects are similar and are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

[1. A method for identifying a device, comprising:

generating, by a control device, an identification identifier of a multimedia device according to device description information of the multimedia device, wherein the multimedia device is an audio device, and wherein the identification identifier is at least one of preset music and a sound with a preset frequency;

sending, by the control device, the identification identifier to the multimedia device, so that the multimedia device displays the identification identifier;

acquiring, by the control device, the identification identifier displayed by the multimedia device and an appearance image of the multimedia device;

acquiring, by the control device, the device description information according to the identification identifier displayed by the multimedia device; and associating, by the control device, the device description information with the appearance image of the multimedia device, so that a user equipment identifies the multimedia device according to the appearance image.]

[2. The method according to claim 1, wherein acquiring, by the control device, the device description information according to the identification identifier displayed by the multimedia device comprises determining, by the control device, that the identification identifier displayed by the multimedia device is consistent with the identification identifier generated by the control device.]

[3. The method according to claim 1, before generating, by the control device, the identification identifier of the multimedia device according to the device description information of the multimedia device, the method further comprises acquiring, by the control device, the device description information and device capability information of the multimedia device.]

[4. The method according to claim 1, wherein generating, by the control device, the identification identifier of the multimedia device according to the device description information of the multimedia device comprises generating, by the control device, the identification identifier of the multimedia device according to a universally unique identifier (UUID) and an internet protocol (IP) address of the multimedia device in the device description information of the multimedia device, and wherein associating, by the control device, the device description information with the appearance image of the multimedia device comprises associating, by the control device, the UUID and the IP address with the appearance image of the multimedia device.]

[5. The method according to claim 1, wherein acquiring, by the control device, the appearance image of the multimedia device comprises acquiring, by the control device, the appearance image of the multimedia device by using a camera.]

[6. A method for identifying a device, comprising:

receiving, by a multimedia device, an identification identifier of the multimedia device from a control device, wherein the multimedia device is an audio device, and wherein the identification identifier is at least one of preset music and a sound with a preset frequency; and displaying, by the multimedia device, the identification identifier, so that the control device acquires device description information of the multimedia device according to the identification identifier and associates the device description information with an appearance image, wherein the identification identifier is generated by the control device according to the device description information of the multimedia device.]

[7. A control device, comprising:

a generating module configured to:

generate an identification identifier of a multimedia device according to device description information of the multimedia device, wherein the multimedia device is an audio device, and wherein the identification identifier is at least one of preset music and a sound with a preset frequency; and send the identification identifier to the multimedia device, so that the multimedia device displays the identification identifier;

a first acquiring module configured to acquire the identification identifier displayed by the multimedia device and an appearance image of the multimedia device;

a second acquiring module configured to acquire the device description information according to the identification identifier displayed by the multimedia device; and an associating module configured to associate the device description information with the appearance image of the multimedia device, so that a user equipment identifies the multimedia device according to the appearance image.]

[8. The control device according to claim 7, wherein the second acquiring module is further configured to:

determine that the identification identifier displayed by the multimedia device is consistent with the identification identifier generated by the control device, and acquire the device description information corresponding to the identification identifier generated by the control device.]

[9. The control device according to claim 7, further comprising a determining module, wherein before the identification identifier of the multimedia device is rated according to the device description information of the multimedia device, the determining module is configured to acquire the device description information and device capability information of the multimedia device.]

[10. The control device according to claim 7, wherein the generating module is further configured to generate the identification identifier of the multimedia device according to a universally unique identifier (UUID) and an internet protocol (IP) address of the multimedia device in the device description information of the multimedia device, and wherein the associating module is further configured to associate the UUID and the IP address with the appearance image of the multimedia device.]

[11. The control device according to claim 7, wherein the first acquiring module is further configured to:

acquire the identification identifier displayed by the multimedia device; and acquire the appearance image of the multimedia device by using a camera.]

*12. A control device comprising:*

*a memory configured to store instructions; and*

*a processor coupled to the memory and configured to execute the instructions to cause the control device to:*

*acquire device description information of a multimedia device via a multicast message from the multimedia device, wherein the multimedia device is an audio device, wherein the device description information is acquired using a predetermined frequency, and wherein the predetermined frequency is dependent on a universally unique identifier (UUID) of the multimedia device;*

*acquire an appearance image of the multimedia device from a network side according to the device description information by searching for the appearance image on the network side based on the device description information; and*

*associate the device description information with the appearance image of the multimedia device.*

*13. The control device of claim 12, wherein an association relationship exists between the appearance image and the device description information.*

*14. The control device of claim 12, wherein the device description information comprises a general attribute of the multimedia device.*

*15. The control device of claim 14, wherein the general attribute comprises a universally unique identifier.*

*16. The control device of claim 12, wherein the processor is further configured to execute the instructions to cause the control device to generate an identification identifier of the multimedia device according to the device description information.*

*17. The control device of claim 12, wherein the processor is further configured to execute the instructions to cause the control device to:*

*display the appearance image of the multimedia device; and*

*establish a connection with the multimedia device in response to a user selection.*

*18. The control device of claim 12, wherein the processor is further configured to execute the instructions to cause the control device to store an association information between the device description information and the appearance image.*

*19. The control device of claim 12, wherein the control device is a mobile phone, a notebook computer, or a tablet computer, and wherein the multicast message is a Simple Service Discovery Protocol (SSDP) alive message.*

*20. A control device comprising:*

*a memory configured to store instructions; and*

*a processor coupled to the memory and configured to execute the instructions to cause the control device to:*

*acquire device description information of a multimedia device via a multicast message from the multimedia device, wherein the multimedia device is an audio device, wherein the device description information is acquired using a predetermined frequency, and wherein the predetermined frequency is 1,000 kilohertz (kHz) or 2000 kHz;*

*acquire an appearance image of the multimedia device from a network side according to the device description information by searching for the appearance image on the network side based on the device description information;*

*associate the device description information with the appearance image of the multimedia device;*

*display the appearance image of the multimedia device; and*

*establish a connection with the multimedia device according to an operation of a user.*

*21. The control device of claim 20, wherein the processor is further configured to execute the instructions to cause the control device to receive a message comprising the device description information from the multimedia device.*

*22. The control device of claim 20, wherein the processor is further configured to execute the instructions to cause the control device to store an association information between the device description information and the appearance image.*

*23. The control device of claim 20, wherein the processor being configured to execute the instructions to cause the control device to acquire an appearance image of the multimedia device from a network side according to the device description information by searching for the appearance image on the network side based on the device description information comprises:*

*acquiring a portal website of a device manufacturer and detailed product information by analyzing the device description information; and*

*searching for the appearance image on the portal website by using the detailed product information.*

*24. The control device of claim 23, wherein the processor being configured to execute the instructions to cause the control device to acquire an appearance image of the multimedia device from a network side according to the device description information by searching for the appearance image on the network side based on the device description information comprises search for more detailed device description information and product description information of the multimedia device on the portal website.*

*25. The control device of claim 20, wherein the device description information comprises a general attribute of the multimedia device.*

*26. The control device of claim 25, wherein the general attribute comprises a universally unique identifier.*

*27. The control device of claim 20 wherein the device description information comprises a model name of the multimedia device.*

*28. The control device of claim 20, wherein an association relationship exists between the appearance image and the device description information, and wherein the predetermined frequency is dependent on a universally unique identifier (UUID) of the multimedia device.*

*29. The control device of claim 20, wherein the processor is further configured to execute the instructions to cause the control device to generate an identification identifier of the multimedia device according to the device description information.*

*30. The control device of claim 20, wherein the control device is a mobile phone, a notebook computer, or a tablet computer.*

*31. A method comprising:*

*acquiring device description information of a multimedia device via a multicast message from the multimedia device, wherein the device description information comprises a general attribute of the multimedia device, wherein the multimedia device is an audio device, wherein the device description information is acquired using a predetermined frequency, and wherein the predetermined frequency is associated with a universally unique identifier (UUID) of the multimedia device;*

*acquiring an appearance image of the multimedia device from a network side according to the device description information by searching for the appearance image on the network side based on the device description information, wherein an association relationship exists between the appearance image and the device description information;*

*associating the device description information with the appearance image of the multimedia device;*

*displaying the appearance image of the multimedia device; and*

*establishing a connection with the multimedia device according to an operation of a user.*

* * * * *